M. HANDY, DEC'D.
A. W. HANDY, ADMINISTRATRIX.
RUBBER VEHICLE SPRING.
APPLICATION FILED OCT. 1, 1910.
1,029,190. Patented June 11, 1912.
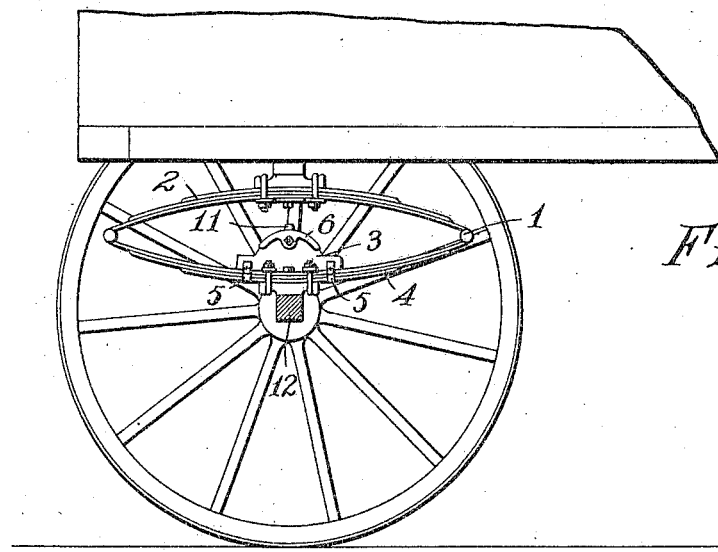
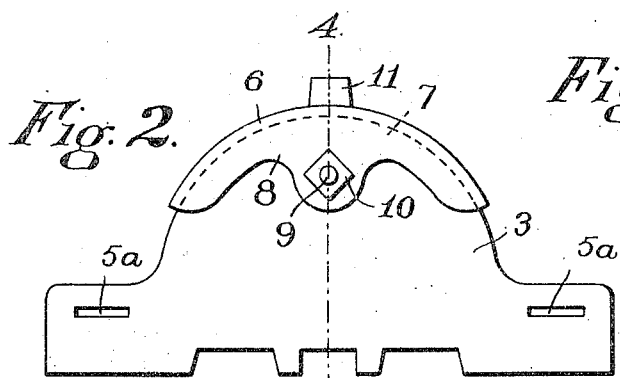
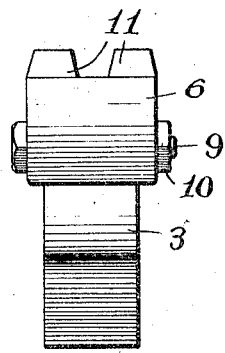
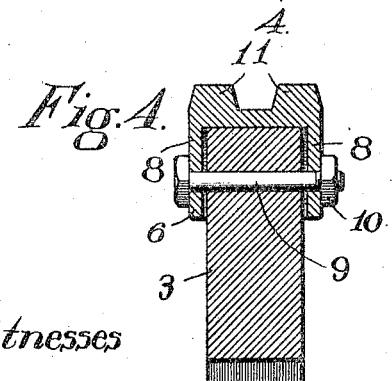
Witnesses
Roy D. Tolman.
Penelope Cumberbatch.
Inventor
Milton Handy.
By Rufus B. Fowler
Attorney

UNITED STATES PATENT OFFICE.

MILTON HANDY, OF WORCESTER, MASSACHUSETTS; ANNIE W. HANDY ADMINISTRATRIX OF SAID MILTON HANDY, DECEASED.

RUBBER VEHICLE-SPRING.

1,029,190.     Specification of Letters Patent.     Patented June 11, 1912.

Application filed October 1, 1910. Serial No. 584,842.

*To all whom it may concern:*

Be it known that I, MILTON HANDY, a citizen of the United States, residing at Worcester, in the county of Worcester and Commonwealth of Massachusetts, have invented a new and useful Improvement in Rubber Vehicle-Springs, of which the following is a specification, accompanied by drawings forming a part of the same.

My present invention relates to an improvement in the rubber springs which are at present employed in connection with elliptic steel springs of vehicles for receiving the shock or jar incident to heavy loads, and it consists in providing means for distributing the strain upon the rubber spring and for protecting it from abrasion.

Figure 1 represents a side view of a steel elliptic spring applied to a vehicle, and having an elastic rubber block mounted upon the lower portion of the elliptic spring provided with a protector and embodying my invention. Fig. 2 is a detached view of the rubber spring with the protector applied thereto. Fig. 3 is an end view. Fig. 4 is a vertical, central sectional view on the line 4—4, Fig. 2.

Similar reference characters refer to similar parts in the different figures.

1 denotes an elliptic spring of the usual construction, beneath the upper leaves 2 of which is applied a rubber block 3, in the present instance mounted upon the lower leaves 4 of the elliptic spring and held thereon by straps 5 passing through openings 5ᵃ in the rubber block and around the leaves 4 of the elliptic spring. In the normal position of the elliptic spring 1 the upper leaves 2 of the spring are held at some distance above the top of the rubber block 3, but when a heavy load is applied to the spring the leaves 2 are forced downward and caused to strike against the top of the rubber block 3, which by its compression absorbs the shock or blow, thereby relieving the elliptic spring from further strain. This function of the rubber block 3 will be well understood as the use of an elliptic rubber block is common in vehicles adapted to carry heavy loads. As employed at present, however, the pressure applied to the arched top or crown of the rubber block is unequally distributed through the mass of the block and the upper surface is soon worn away and abraded by the hammering action of the elliptic spring.

I cause the strain applied to the elastic rubber block 3 to be more equally distributed and its upper surface prevented from abrasion when in use, and the duration of the block trebled and even quadrupled by applying to the upper or arched crown of the block 3 a metal cap 6 having its inner surface concave to fit the arched form of the rubber block, as indicated by the broken line 7. Depending from the opposite sides of the cap 6 are flanges 8, 8, which prevent the undue lateral expansion of the block beneath the cap, and also provide means for its attachment to the block 3 by means of a bolt 9 and nut 10 passing through the flanges 8, 8 and the body of the block 3. Upon the upper surface of the cap 6 I preferably provide a transverse rib 11 to receive the contact of the upper leaves of the elliptic spring.

I claim,

1. In combination with a vehicle spring and an elastic block arranged to receive said spring upon its extreme compression, of a metal cap attached to said elastic block and covering a larger surface of said block than the point of contact with said vehicle spring.

2. In combination with a vehicle spring and an elastic block attached to a solid base on said vehicle, arranged to receive said spring upon its extreme compression, of a metal cap attached to said block and covering the point of contact with said vehicle spring.

3. In combination with a vehicle spring and a semi-cylindrical elastic block arranged to receive said spring upon its extreme compression, of a metal cap mounted upon the upper surface of said block and provided with side flanges depending from said cap and arranged to prevent the undue lateral expansion of said block beneath said cap.

4. In combination with an elliptic vehicle spring and a semi-cylindrical elastic block attached to the lower leaves of said spring, arranged to receive the upper leaves of said spring upon its extreme compression, of a metal cap mounted upon the upper or arched crown of said block, covering more of said crown than the point of contact with said vehicle spring and provided with depending side flanges preventing undue lateral expansion of said block and providing means for the attachment of said cap and said block.

MILTON HANDY.

Witnesses:
 PENELOPE COMBERBACH,
 NELLIE WHALEN.